- Place solder preform in bottom of can.
- Partially insert capacitor body in can.
- Partially immerse can and body assembly in hot bath.
- Completely insert body in can and seat cover assembly and solder washer in can end.
- Further immerse can into bath and melt solder washer.
- Remove assembly from bath and cool.

3,495,323
ASSEMBLY OF UNITS IN METAL CONTAINERS
Lawrence E. Fournier, Kennebunk, Maine, assignor to Sprague Electric Company, North Adams, Mass., a corporation of Massachusetts
Filed Jan. 24, 1968, Ser. No. 700,202
Int. Cl. B23p 19/04; B23k 31/02
U.S. Cl. 29—570                                8 Claims

ABSTRACT OF THE DISCLOSURE

Solder attachment of a silver coated electrical unit in a tinned metal container using a bath of a fluid inert heat exchange medium having a low vapor pressure and non-reactive with the metal container.

Background of the invention

This invention relates to the assembly of silver coated electrical bodies into metal containers and more particularly to the application of heat for melting of solder for the attachment of the body to the container and connection of the silver coat to the container.

Capacitor bodies such as solid tantalum capacitors are enclosed and sealed within metal containers preferably tinned cans. The capacitor bodies are coated with a delicate silver coat on the exterior surface which acts as an electrode of the capacitor. The cans are electrically attached to this counterelectrode by solder with an electrical lead being suitably attached to the metal can. The encased capacitors are tightly sealed within the can by a glass-to-metal seal. In the assembly technique for enclosing the capacitor body in the metal can, a solder is first inserted in the can and then the silver coated capacitor body is inserted in the can. Melted solder makes contact with the silver counterelectrode and the can inner wall and upon cooling provides the interconnection between these parts.

A solder washer and a glass cover are seated at the open end of the can over the capacitor body and when the assembled can and body and cover are heated the solder washer at the open end of the can melts. This melting causes the solder to flow into sealing contact between the glass cover and the metal can. The solder washer on hardening forms the seal between the glass cover and the inside of the can wall.

Previously, the heat has been applied by electrodes contacting the outside of the can or by infra-red heating or merely by flame soldering. Under these manufacturing techniques, the connection of the can with its contents may be defective or uneven having voids. The cover seal of solder may develop pinholes destroying the seal. The silver coat comprising the counterelectrode is susceptible to deterioration, particularly as the result of improper application of heat. For example, the silver coating composition preferably contains an organic vehicle, such as methyl methacrylate, as a constituent.

During the assembly process the tinned brass cans suffer a marring of the tin coat which defaces the exterior. This occurs, for example, on the application of electrodes to the can to apply heat for melting the solder.

Summary of the invention

The application of heat to a capacitor can and a silver coated body in the assembly of the body in the can is achieved by placing the assembled parts in a bath of a fluid inert heat exchange medium having a low vapor pressure and a flash point above the decomposition temperature of the silver coat. Preferably, the bath is maintained at a temperature in the range of 200° to 225° C., and the heat exchange medium has a flash point in excess of 250° C. The heat transfers through the can from all directions and uniformly to gradually melt the solder at the precisely controlled temperature in a very uniform fashion so that the solder flows uniformly and adjusts to the maximum contact between the silver and the can. The temperature of the hot bath is accurately and easily controlled to the necessary temperature but not in excess thereof.

As a further feature, during the application of heat from the bath to the capacitor assembly, the assembly is subjected to vibration introduced into the fluid bath, including ultrasonic motion.

It is an object of this invention to provide an improved method of connecting a metal capacitor can to a silver coated capacitor body by a solder connection.

It is another object of this invention to provide an improved method of melting the solder in canning electrical units in tinned cans.

A further object of this invention is an accurate and even control of the application of heat in the assembly of silver coated electrical units into metal cans.

Brief description of the drawings

These and other objects will become more apparent upon consideration of the following description taken together with the accompanying drawing in which.

Figures 1, 2:
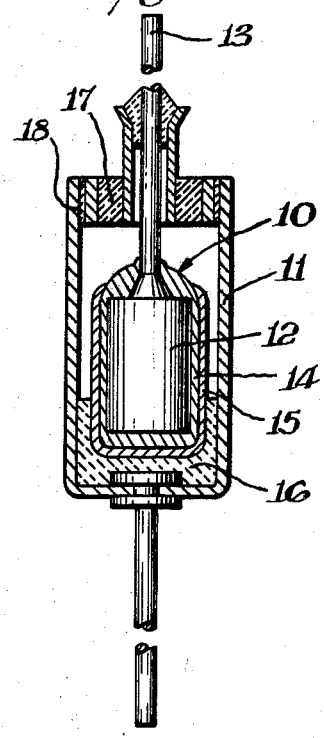
FIGURE 1 is a block chart identifying steps of the method of assembly of parts according to this invention.
FIGURE 2 is a vertical section of a capacitor assembled in and connected to a can according to this invention.

In its preferred embodiment, the method of this invention has a solid electrolyte capacitor body coated with a silver counterelectrode assembled into a brass can having a tin coat on its surface. The capacitor is made up of a pellet, as for example of tantalum, on the surfaces of which is formed a dielectric oxide by anodization and this oxide film in turn is covered by a manganese dioxide solid electrolyte. The capacitor body is completed by a thin layer of silver overlying the manganese dioxide layer to form a counterelectrode. The anode lead extends from one end of the tantalum pellet and the silver counterelectrode is coated over the manganese dioxide of the body and across the other end but out of contact with the anode lead.

After the capacitor body has been constructed on the pellet and the silver counterelectrode coat is applied, the silver coated body is assembled into the tinned can. For this assembly, the body is first prepared by the mounting of a cover assembly on the anode lead and the insertion of a solder preform into the bottom of the can. Preferably, the preform of solder is previously melted into place at the bottom of the can and permitted to cool. The silver coated capacitor body is introduced into the open end of the can and held against the solder preform with its upper end still protruding from the open end of the can. Consequently, the cover assembly is held out of a seat in the open end of the can. The closed end of the can, the lead first, is then inserted in a hot bath of a fluid inert heat exchange medium having a suitable flash point. The bath is maintained at a temperature which quickly transmits sufficient heat to the solder preform to quickly melt it. With the remelting of the solder, the capacitor body is moved into the can to a position totally within the can which also brings the cover assembly into position in the open end of the can. The cover assembly has associated with it a solder ring which flows on melting to provide a sealing means between the cover assembly and the can. In some procedures, the can is preferably lowered further into the bath after the initial melting of the solder preform so as to assist the melting of the solder of the cover assembly and insure its uniform flow to provide the sealing means between the cover assembly and the can. On removal from the bath, the capacitor assembly cools and the solder hardens to a permanent state with the capacitor body and cover fixed in position and the tin coat on the can surfaces reflowed to a smooth coat.

Referring to the block chart of FIGURE 1, the first step in the assembly of this capacitor body in the tinned can is the placing of a solder preform in the closed bottom of the can which has an external lead. The solder may be silver bearing 60/40 solder or antimony solder. Only enough solder is placed in the can to partially fill the can upon melting.

Next, a silver-coated capacitor body carrying a cover assembly on its lead is partially inserted in the can and brought to bear against the previously inserted solder preform which has hardened on cooling.

In the next step, as indicated in the block chart, the can containing the partially inserted capacitor body is then only partially immersed in the bath so that the level of the fluid bath extends only part way up the side of the can, preferably no higher than the middle. Upon this immersion of the can, the solder is remelted at the bath temperature which according to the preferred embodiment is maintained in the range of 200° to 225° C. The fluid medium acts as a uniform heat sink all around the periphery of the can independent of air drafts. The depth of immersion is accurately controlled so that the heat transfers through the metal can uniformly and to the solder preform and applies heat to the preform to gradually remelt it.

In the next step, as indicated in the block chart, with the remelting of the solder preform, the capacitor body sinks further into the can under the bearing pressure and into its position totally within the can and into the molten solder at the bottom of the can. The silver coat on the capacitor body of the preferred embodiment is wetted by the molten solder but this silver does not deteriorate at the controlled temperature of 200–225° C. The same step fits the assembly of the glass-metal cover and the solder washer in the open end of the can. The cover is moved down to and into the open end of the can and into position for closing the open end of the can. The washer is over the cover.

Next, the can is then inserted further into the hot bath so that the level of the bath reaches approximately three-quarters of the total can length. The assembly is left in this position while the solder washer melts and flows to form a negative miniscus sealing the cover to the inner wall of the can.

Finally, the assembly is removed from the bath and cooled so that the solder hardens to a permanent fixed state in which the solder at the bottom of the can is spread uniformly and continuously adheres to silver at the lower end of the capacitor body and is in good electrical contact therewith while also adhering and being electrically connected to the inner wall of the can so as to provide a superior electrical contact between the body and the can.

It is a further feature of this method that motion may be applied to the fluid medium during the immersion cycle by suitable vibratory apparatus available in the chemical process industry. This is advantageous in having a desirable effect on the solder which is molten during the cycle.

Any of the standard methods of making a solid electrolyte capacitor body can be used to manufacture the capacitor body. For example, a sintered tantalum carrying an anode lead is anodized to form the dielectric film. Then manganous nitrate applied to the film-formed pellet body is suitably decomposed by pyrolysis at elevated temperatures to convert to a manganese dioxide layer. After the deposition of the manganese dioxide layer on the pellet by suitable firing, the pellet is further processed by finishing procedures which include, among other steps, the application of the counterelectrode. The counterelectrode may include a graphite coating applied to the manganese dioxide layer as by dipping in a colloidal graphite solution, Aquadag, and subsequently drying. Next a conductive silver coating is applied to complete the capacitor body. One suitable method for applying the silver coating is by dipping the coated pellet in a conductive silver paste having a consistency which forms a thin silver coat on the manganese dioxide layer. The cured silver coat covers three-quarters to seven-eighths of the length of the body, but does not contact the anode lead. The thin silver coat is coherent and continuous. It forms the other electrode of the capacitor body, the tantalum pellet forming the first electrode. The manganese dioxide layer acts in the roll of an electrolyte between these electrodes.

The tinned brass can may be deep with a thin wall. Table I sets forth examples of several tinned brass cans found to be particularly useful in this invention.

TABLE I

| Case: | Overall height, inch | Overall diameter, inch |
|---|---|---|
| A | 0.265 | 0.125 |
| B | 0.425 | 0.175 |
| R | 0.650 | 0.279 |
| S | 0.750 | 0.341 |

The cover assembly is made up of a fused glass between a metal tube and a steel ring. This composite unit is put together and inserted as an integral unit over the anode lead. The solder preform and the solder ring is preferably of antimony solder or 60/40 solder.

The objects of the present invention are achieved by preparing a fluid inert heat exchange medium having low vapor pressure and a flash point above 250° C. Also the fluid medium is one which will transmit vibration waves, including the ultrasonic range, to the immersed metal cans when the vibration is applied to the medium. Hydrofol glyceride and a turbine oil, such as AeroShell-B turbine oil, are two materials which have these properties and are found to be sufficiently fluid in the temperature range of 200–225° C. of the preferred embodiment. The bath temperature may range upward under control conditions above the specified 200–225° C. range of the preferred embodiment. In the broader aspect, the bath temperature may be controllably adjusted to a higher temperaure to accommodate to various conditions and materials.

The following example of an embodiment of the present method of soldering solid tantalum type capacitors is merely illustrative of the use of the hot bath method which can also be operated on a continuous multiple assembly basis to encase capacitor bodies on a commercial production basis.

Example

A tank containing Aero-Shell-B turbine oil is provided with means for heating the oil to around 205° C. A thin brass can of Case Size A of Table I and carrying a wire lead contains a solder preform of 60/40 solder placed in the can and allowed to harden. An anode body of about .090″ diameter and carrying a glass-to-metal cover assembly and solder washer is inserted into the can and abutted against the hardened solder under a spring pressure. The anode body is made up with a silver counterelectrode applied from Du Pont silver paste No. 4817 composed of slightly over 40% silver and the balance an organic resin as vehicle. This is a product of the Du Pont Company of Wilmington, Del. The assembly of the can and body in a soldering rack is immersed in the heated oil bath with the can lead extending down with the level of the bath reaching to about the middle of the can and less than three-quarters of the height of the can. The can is held in this position to gradually melt the solder preform. When the solder has reached the molten state the spring pressure moves the anode body into a position of full containment in the can. The can is lowered further into the turbine oil to a depth covering approximately three-quarters of the total can length and is held in this position while the solder ring gradually melts and flows between the cover assembly and the can wall and closing the open end of the can. Finally, the assembled unit is removed from the oil bath on the soldering rack and allowed to cool.

Referring to the illustrated embodiment, FIGURE 2 shows a solid electrolyte capacitor assembly of a capacitor assembly of a capacitor body 10 in a metal can 11. The body has a tantalum pellet 12 on which is formed a dielectric film not shown. A lead 13 is attached on one end of the pellet 12. Layer 14 of electrolyte overlies the dielectric film on the pellet 12 and silver counterelectrode 15 overlies the layer 14 on the capacitor body 10 and opposite the lead 13 and up the sides of the body 10. A graphite coat, not shown, may also be interpositioned between electrolyte layer 14 and the silver counterelectrode 15. A connecting solder 16 at the bottom of the can 11 adheres to the silver counterelectrode 15. At the open end of the can 11 the compressed glass-metal cover 17 closes the end of the can and a cover solder ring 18 extends along the side of the glass-metal cover between the cover 17 and the inner wall of the can 10 to seal the unit closed.

The method of this invention applies the heat gradually and precisely and allows the assembly to be held under the heating conditions for a reasonably long time as compared to previous methods without deleterious effects on the silver coat. For example, it is possible to carry the heating on for as much as a minute, with periods of 30 to 40 seconds the usual time. Further it is not possible to heat the capacitor assembly to above a maximum desired temperature, as for example 225° C. Thus the silver coat can withstand the treatment. The depth of immersion can be controlled so that the heat transfers through the can to uniformly melt the cover solder.

Further advantages include the uniform application of heat and avoidance of hot spots. The resultant encased capacitor is free of voids in the solder contact between can and silver coat and free of pinholes in the end seal solder. Of particular importance is the appearance of the reflowed tin on the can exterior.

While the preferred embodiment sets forth a capacitor body having a specified silver formulation for the counterelectrode, it will be understood that the capacitor body may incorporate other silver formulations, and with different formulations different significant values will be taken into consideration. The embodiment is set forth for the purpose of illustration and further modifications within the spirit of this invention will be readily apparent to those skilled in the art.

What is claimed is:

1. The method of producing a capacitor assembly having a capacitor body with a silver coating comprising the steps of placing a tinned metal can containing a solder piece partially in a bath of a stable fluid heat-exchange medium, maintaining said bath at a temperature less than the flash point of the fluid heat exchange medium and less than the decomposition temperature of the silver coating and higher than the temperature at which the solder melts, melting the solder in said bath, urging said silver coated capacitor body into the molten solder in the can, and seating a glass-to-metal cover and additional solder in the open end of the can with the can immersed into the bath so as to melt and flow the additional solder around the cover.

2. The method as defined in claim 1 wherein the can is first partially immersed in the bath to melt the solder, and then the can is further but not wholly immersed in the bath to melt said additional cover solder.

3. In the method of claim 2 the step of placing the tinned metal can in a bath at a temperature of 200° to 225° C.

4. In the method of claim 2 the step of placing the tinned metal can in a bath of hydrofol glyceride wax in the temperature range of 200° to 225° C.

5. In the method of claim 2 the step of placing the tinned metal can in a bath of turbine oil in the temperature range of 200° to 225° C.

6. The method as defined in claim 2 wherein the tin coat on the exterior of the can is reflowed to produce a smooth coat.

7. In the method of claim 2 the step of applying a vibratory motion to the bath during the immersion step.

8. The method according to claim 7 in which the motion is ultrasonic.

References Cited

UNITED STATES PATENTS

| 3,009,241 | 11/1961 | Giovanucci | 29—501 XR |
| 3,279,038 | 10/1966 | Coper | 29—471.1 XR |
| 3,293,507 | 12/1966 | Smith | 29—570 XR |
| 3,307,086 | 2/1967 | Propps | 29—570 XR |
| 3,314,124 | 4/1967 | Okamoto et al. | 29—570 |
| 3,373,320 | 3/1968 | Krock et al. | 29—570 XR |

JOHN F. CAMPBELL, Primary Examiner

RICHARD B. LAZARUS, Assistant Examiner

U.S. Cl. X.R.

29—498; 501; 313—270